US012776831B2

(12) United States Patent
Lee et al.

(10) Patent No.: US 12,776,831 B2
(45) Date of Patent: Oct. 27, 2026

(54) METHOD, RECORDING MEDIUM, AND APPARATUS FOR DETERMINING SATELLITE ORBITAL POSITIONS AND ROUTING FOR LOW EARTH ORBIT SATELLITE NETWORK

(71) Applicant: Korea University Research and Business Foundation, Seoul (KR)

(72) Inventors: Inkyu Lee, Seoul (KR); Young-Min Jeon, Suwon-si (KR); Zhilin Fu, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 262 days.

(21) Appl. No.: 18/785,746

(22) Filed: Jul. 26, 2024

(65) Prior Publication Data

US 2025/0038835 A1 Jan. 30, 2025

(30) Foreign Application Priority Data

Jul. 28, 2023 (KR) ........................ 10-2023-0098891

(51) Int. Cl.
*H04B 7/185* (2006.01)

(52) U.S. Cl.
CPC ..... *H04B 7/18513* (2013.01); *H04B 7/18521* (2013.01)

(58) Field of Classification Search
None
See application file for complete search history.

(56) References Cited

U.S. PATENT DOCUMENTS 7,184,761 B1 * 2/2007 Wang ...................... H04B 7/195 455/430
2018/0323863 A1 * 11/2018 Bournes ............... H04B 10/118
(Continued)

FOREIGN PATENT DOCUMENTS

CA 2893428 A1 * 6/2014 ......... H04B 7/18515
EP 2168257 B1 * 5/2013 ......... H04B 7/18532
(Continued)

OTHER PUBLICATIONS

Youngmin Jeon et al., "Routing design in multi-LEO satellite network", Korea Institute of Communications and Information Sciences Winter General Academic Conference, pp. 1425-1426, 2022, with its English machine translation.
(Continued)

*Primary Examiner* — Eunsook Choi
(74) *Attorney, Agent, or Firm* — Hauptman Ham, LLP

(57) ABSTRACT

The present disclosure relates to a method of determining satellite orbital positions and routing for a Low Earth Orbit (LEO) satellite network, and the method calculates a communication throughput in each of a link between the transmitting base station and a satellite deployed on the first orbit, a link between satellites deployed on the first and second orbits, and a link between a satellite deployed on the second orbit and the receiving base station, and calculating a communication throughput in an entire link between the transmitting base station and the receiving base station on the basis of the communication throughput in each link, determines satellite orbital position variables and routing variables for maximizing the communication throughput in the entire link, and determines deployment of satellites on the first and second orbits on the basis of the satellite orbit position variables and routing variables.

13 Claims, 5 Drawing Sheets

(56) References Cited

U.S. PATENT DOCUMENTS

| | | | | |
|---|---|---|---|---|
| 2022/0363416 | A1 | 11/2022 | Mukae | |
| 2025/0038835 | A1* | 1/2025 | Lee .................... | H04B 7/18513 |

FOREIGN PATENT DOCUMENTS

| | | | |
|---|---|---|---|
| KR | 10-2008-0066503 | A | 7/2008 |
| KR | 10-2021-0064032 | A | 6/2021 |
| KR | 10-2402437 | B1 | 5/2022 |
| KR | 10-2023-0063166 | A | 5/2023 |

OTHER PUBLICATIONS

Korean Office Action issued on Oct. 23, 2024, in connection with the corresponding Korean Patent Application No. 10-2023-0098891, 8 pages, with its English machine translation.

* cited by examiner

METHOD, RECORDING MEDIUM, AND APPARATUS FOR DETERMINING SATELLITE ORBITAL POSITIONS AND ROUTING FOR LOW EARTH ORBIT SATELLITE NETWORK

CROSS-REFERENCE TO RELATED APPLICATION(S)

The present application claims the benefit of priority to Korean Patent Application No. 10-2023-0098891 filed on Jul. 28, 2023, in the Korean Intellectual Property Office. The aforementioned application is hereby incorporated by reference in its entirety.

BACKGROUND OF THE INVENTION

Field of the Invention

The present invention relates to a method, a recording medium, and an apparatus for determining satellite orbital positions and a path for a Low Earth Orbit (LEO) satellite network.

Background of the Related Art

In communications between two base stations spaced very far apart from each other, such as intercontinental communications, wired communications through submarine cables have insufficient resources for meeting future communication demands, and interest in the techniques for improving communication efficiency and performance by arranging low earth orbit satellites between base stations to assist communications between two base stations spaced far apart from each other is growing recently to solve this problem.

As the low earth orbit satellites are located at the altitudes relatively close to the Earth and have a low delay time, there are advantages of enabling fast real-time communication, excellent responsiveness, high data transmission rate, multiple routing, and relatively low launch costs as they are located on low earth orbits.

Meanwhile, it is very important for a low earth orbit satellite network to optimally set the orbits of the satellites taking into account relative positions, orbital altitudes, cycles, and the like of the satellites with respect to the Earth to cover various areas of the Earth as much as possible, and set an optimal path to assist communications between base stations.

Therefore, research on a method of optimizing satellite orbital positions and a path for a low earth orbit satellite network is needed.

PRIOR ART LITERATURE

Patent Document (Patent Document 1) Korean Patent Publication No. 10-2021-0064032

SUMMARY OF THE INVENTION

Therefore, the present invention has been made in view of the above problems, and it is an object of the present invention to provide a method, a recording medium, and an apparatus for optimizing satellite orbital positions and a path for a low earth orbit satellite network.

To accomplish the above object, according to one aspect of the present invention, there is provided a method of determining satellite orbital positions and routing for a Low Earth Orbit (LEO) satellite network located on a first orbit on a transmitting base station side and a second orbit on a receiving base station side, the method comprising the steps of: calculating a communication throughput in each of a link between the transmitting base station and a satellite deployed on the first orbit, a link between satellites deployed on the first and second orbits, and a link between a satellite deployed on the second orbit and the receiving base station, and calculating a communication throughput in an entire link between the transmitting base station and the receiving base station on the basis of the calculated communication throughput in each link; determining satellite orbital position variables and routing variables for maximizing the communication throughput in the entire link; and determining deployment of satellites on the first and second orbits on the basis of the determined satellite orbit position variables and routing variables.

To accomplish the above object, according to another aspect of the present invention, there is provided an apparatus for determining satellite orbital positions and routing for a Low Earth Orbit (LEO) satellite network located on a first orbit on a transmitting base station side and a second orbit on a receiving base station side, the apparatus comprising: a communication throughput calculation unit for calculating a communication throughput in each of a link between the transmitting base station and a satellite deployed on the first orbit, a link between satellites deployed on the first and second orbits, and a link between a satellite deployed on the second orbit and the receiving base station, and calculating a communication throughput in an entire link between the transmitting base station and the receiving base station on the basis of the calculated communication throughput in each link; a variable determination unit for determining satellite orbital position variables and routing variables for maximizing the communication throughput in the entire link; and a satellite deployment determination for determining deployment of satellites on the first and second orbits on the basis of the determined satellite orbit position variables and routing variables.

DETAILED DESCRIPTION OF THE PREFERRED EMBODIMENT

Figure 1:
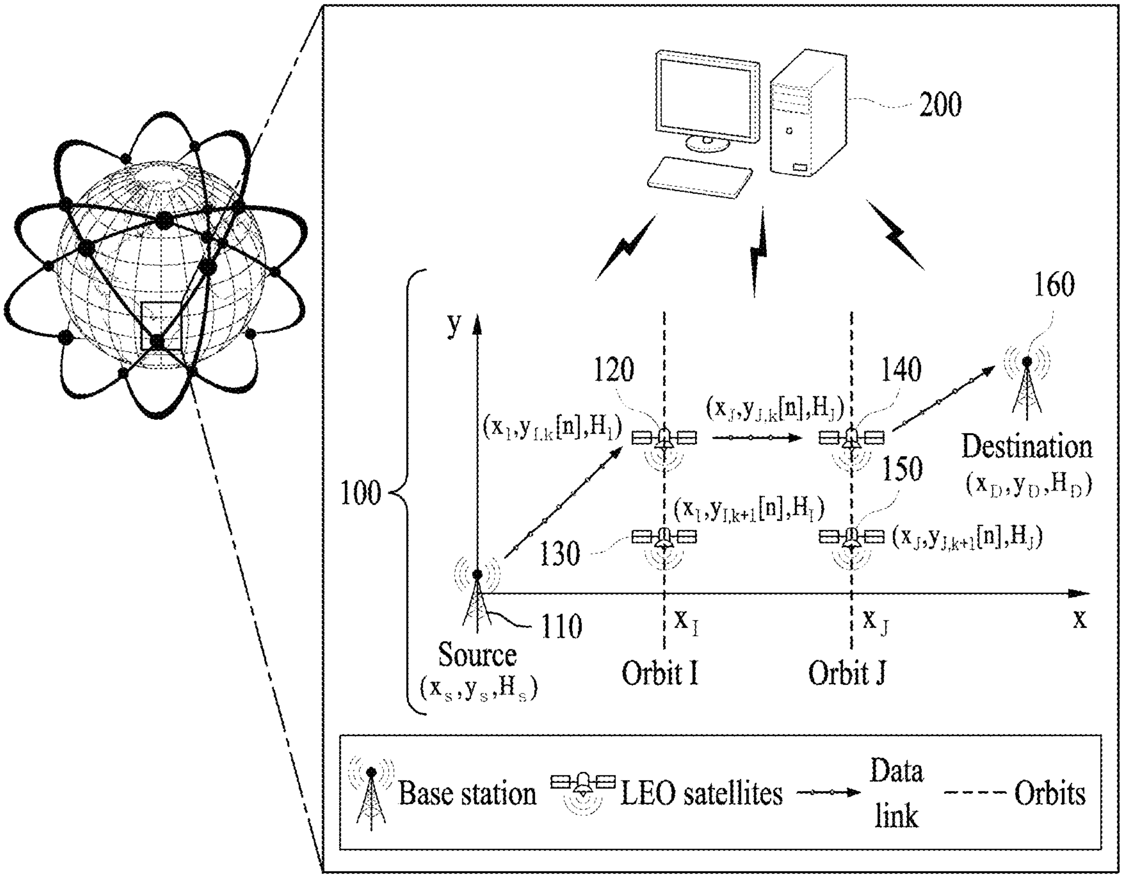
FIG. 1 is a view showing an example of a low earth orbit satellite network according to an embodiment of the present invention.

The detailed description of the present invention is described below with reference to the accompanying drawings, which shows, as an example, specific embodiments in which the present invention may be embodied. These embodiments are described in detail as sufficient as to embody the present invention by those skilled in the art. It should be understood that although the various embodiments of the present invention are different from one another, they are not necessarily mutually exclusive. For example, specific shapes, structures and characteristics described herein may be implemented in other embodiments without departing from the spirit and scope of the present invention in relation to an embodiment. In addition, it should be understood that the location or arrangement of individual components within each disclosed embodiment may be changed without departing from the spirit and scope of the present invention. Accordingly, the detailed description described below is not intended to be taken in a limiting sense, and the scope of the present invention is limited, if properly described, only by the appended claims, together with all the scopes equivalent to those claimed in the claims. In the drawings, similar reference numerals refer to identical or similar functions across several aspects.

Components according to the present invention are components defined not by physical classification but by functional classification, and may be defined by the functions performed by each component. Each component may be implemented as hardware or program codes and processing units (or processors) that perform respective functions, and functions of two or more components may be implemented to be included in one component. Therefore, the names given to the components in the following embodiments are not to physically distinguish each component, but to imply a representative function performed by each component, and it should be noted that the technical spirit of the present invention is not limited by the names of the components.

Hereinafter, preferred embodiments of the present invention will be described in more detail with reference to the drawings.

FIG. 1 is a view showing an example of a low earth orbit satellite network according to an embodiment of the present invention.

Referring to FIG. 1, the illustrated low earth orbit satellite network 100 includes a source BS 110, which is a transmitting base station (BS) that transmits signals, a destination BS 160, which is a receiving BS that receives the signals, and satellites 120, 130, 140, and 150 that relay the signals. As shown in FIG. 1, the low earth orbit satellite network 100 assumes that situations in the spherical coordinate system may be approximated to those in the plane coordinate system and assumes Line-of-Sight (LOS) channel situations.

Satellites corresponding to reference numerals 120 and 130 among the satellites 120, 130, 140, and 150 are located on orbit I close to the source BS 110, and satellites corresponding to reference numerals 140 and 150 are located on orbit J close to the destination BS 160.

Coordinate information indicating a position in the plane coordinate system for each of the source BS 110, destination BS 160, and satellites 120, 130, 140, and 150 may be expressed as described below.

Coordinate information of the source BS 110 may be expressed as $(x_s, y_s, H_s)$, and coordinate information of the destination BS 160 may be expressed as $(x_D, y_D, H_D)$, and here, H represents the altitude in the plane coordinate system, S is an index indicating the source BS, and D is an index indicating the destination BS.

Coordinate information of the satellite located on orbit I and corresponding to reference numeral 120 is $(x_I, y_{I,k}[n], H_I)$, and coordinate information of the satellite corresponding to reference number 130 is $(x_I, y_{I,k+1}[n], H_I)$, and here, k is an index indicating the number of satellites, and n is an index indicating a time slot.

Coordinate information of the satellite located on orbit J and corresponding to reference number 140 may be expressed as $(x_J, y_{J,k}[n], H_J)$, and coordinate information of the satellite corresponding to reference number 150 may be expressed as $(x_J, y_{J,k+1}[n], H_J)$.

The source BS 110 may transmit signals to any one of the satellites located on orbit I, and the destination BS 160 may receive the transmission signals of the source BS 110 from any one of the satellites located on orbit J. FIG. 1 shows, as an example, a case where the source BS 110 transmits a signal to the satellite 120 located on orbit I, and the destination BS 160 receives the signal through the satellite 140 located on orbit J.

In this case, routing that determines satellites that will be connected to the source BS 110 and the destination BS 160 and determining the orbital positions of these satellites are very important in enhancing communication efficiency and performance. Accordingly, an embodiment of the present invention proposes a separate apparatus 200 for optimizing the satellite orbital positions and routing of the illustrated low earth orbit satellite network 100. The apparatus 200 may enhance the communication efficiency and performance of the low earth orbit satellite network 100 by optimizing the satellite orbital positions and routing, and may be implemented, for example, as a server, a desktop personal computer (PC), a laptop PC, a smart phone, a tablet personal computer (PC), a smart watch, or the like.

Figure 2:
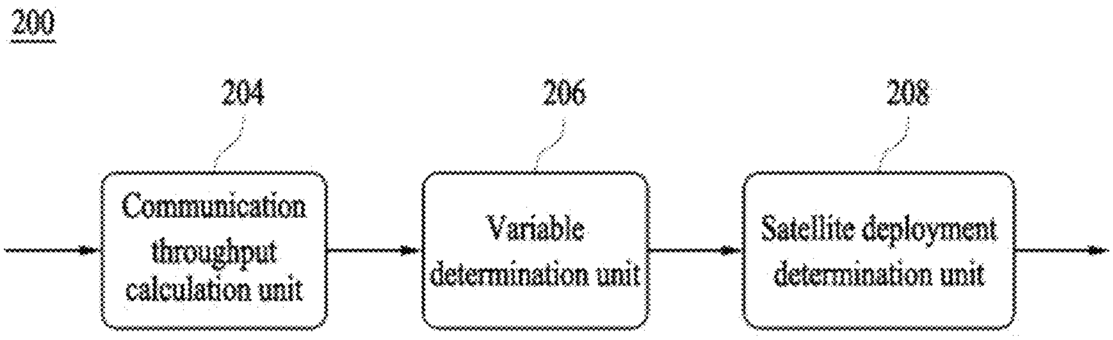
FIG. 2 is a view showing internal blocks of an apparatus for optimizing satellite orbital positions and routing according to an embodiment of the present invention.

FIG. 2 is a view showing internal blocks of an apparatus for optimizing satellite orbital positions and routing according to an embodiment of the present invention.

Referring to FIG. 2, the illustrated apparatus 200 includes a communication throughput calculation unit 204, a variable determination unit 206, and a satellite deployment determination unit 208. In some embodiments, each of the communication throughput calculation unit 204, the variable determination unit 206, and the satellite deployment determination unit 208 comprises hardware circuitry and/or is configured wholly or partly by one or more processors configured to perform one or more functions and/or operations as described herein.

The communication throughput calculation unit 204 calculates a communication throughput in each of a link between the transmitting BS (source BS) and a satellite deployed on a first orbit (orbit I) close to the transmitting BS, a link between a satellite deployed on a second orbit (orbit J) close to the receiving BS (destination BS) and the receiving BS, and a link between the satellites deployed on the first and second orbits, and calculates a communication throughput in the entire link between the transmitting BS and the receiving BS on the basis of the communication throughput in each link.

The variable determination unit 206 determines satellite orbital position variables and routing variables so that the calculated communication throughput in the entire link may be maximized. That is, the variable determination unit 206 determines optimal routing variables having the maximum value of the communication throughput in the entire link for each time slot, and determines optimal satellite orbital position variables having the maximum value of the communication throughput in the entire link to which the determined optimal routing variables are applied.

The satellite deployment determination unit 208 determines deployment of satellites on the first and second orbits on the basis of the determined satellite orbital position variables and routing variables.

Figure 3:
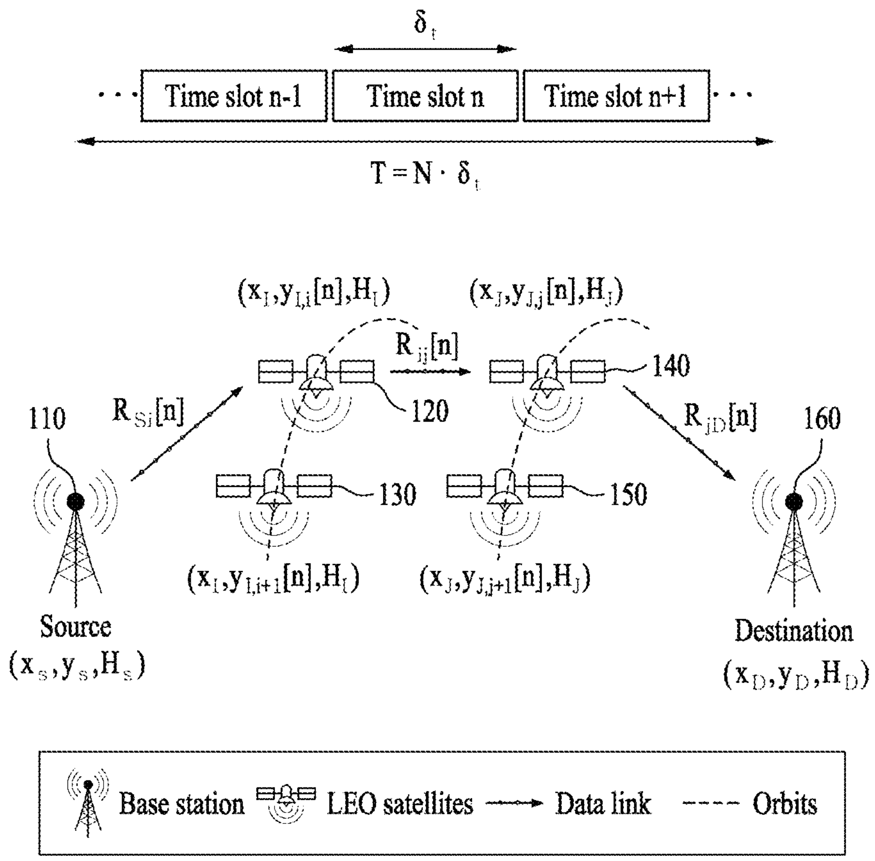
FIG. 3 is a view showing an example of an operation for optimizing satellite orbital positions and routing according to an embodiment of the present invention.

FIG. 3 is a view showing an example of an operation for optimizing satellite orbital positions and routing according to an embodiment of the present invention.

Referring to FIG. 3, the illustrated system assumes the low earth orbit satellite network described in FIG. 1, and will be described using the same reference numerals as those of FIG. 1.

Assuming a LOS channel situation as described above in FIG. 1, the communication throughput between the source BS 110 and the destination BS 160 in time slot n may be expressed as shown in Equation 1.

$$R[n] = W\log_2\left(1 + \frac{\gamma_0}{(d[n])^2}\right) \quad \text{[Equation 1]}$$

Here, W denotes the bandwidth of a channel, d[n] denotes the distance from one node (e.g., a BS/satellite) to another node (e.g., another BS/satellite) in an n-th time slot, and $\gamma 0$ denotes the reference signal to noise ratio (SNR) at a distance of 1 meter.

As a plurality of satellites is located on an orbit and a plurality of links may be created therefrom, the source BS 110 and the destination BS 160 should determine a link through routing, and a routing variable is required to determine a link. The conditions for the routing variable are as shown in Equation 2.

$$a_{Si}[n],\ a_{jD}[n] \in \{0, 1\} \quad \text{[Equation 2]}$$
$$\sum_{i \in I} a_{Si}[n] \le 1$$
$$\sum_{j \in J} a_{jD}[n] \le 1$$

Here, $a_{S_i}[n]$ and $a_{jD}[n]$ represent the connection relation between the source BS 110 and the i-th satellite 120 on orbit I and the connection relation between the j-th satellite 140 on orbit J and the destination BS 160, respectively, and it is defined that 0 means an unconnected state and 1 means a connected state. Since the source BS 110 and destination BS 160 should be connected to only one satellite on each orbit, the value of the routing variable between the BS and each orbit is equal to or smaller than 1. Considering this, the communication throughput in each link may be calculated using Equation 3.

$$R_{Si}[n] = W\log_2\left(1 + \frac{\gamma_0}{(x_I - x_S)^2 + (y_I[n] - y_S)^2 + (H_I - H_S)^2}\right) \quad \text{[Equation 3]}$$
$$R_{ij}[n] = W\log_2\left(1 + \frac{\gamma_0}{(x_I - x_J)^2 + (y_I[n] - y_J[n])^2 + (H_I - H_S)^2}\right)$$
$$R_{jD}[n] = W\log_2\left(+\frac{\gamma_0}{(x_J - x_D)^2 + (y_J[n] - y_D[n])^2 + (H_J - H_D)^2}\right)$$

$R_{ij}[n]$ denotes the communication throughput in the link between the satellite 120 and the satellite 140, and $R_{jD}[n]$ denotes the communication throughput in the link between the satellite 140 and the destination BS 160.

At this point, the satellites 120 and 140 transmit signals in a Decode and Forward (DF) relay method. In this case, the communication throughput in the entire link between the source BS 110 and the destination BS 160 in the n-th time slot may be calculated using Equation 4.

$$R_{SD}[n] = a_{Si}[n]a_{jD}[n]\min(R_{Si}[n], R_{ij}[n], R_{jD}[n]) \quad \text{[Equation 4]}$$

Here, $a_{Si}[n]$ denotes the connection relation between the source BS 110 and the satellite 120, $a_{jD}[n]$ denotes the connection relation between the satellite 140 and the destination BS 160, $R_{Si}[n]$ denotes the communication throughput in the link between the source BS 110 and the satellite 120, $R_{ij}[n]$ denotes the communication throughput in the link between the satellite 120 and the satellite 140, and $R_{jD}[n]$ denotes the communication throughput in the link between the satellite 140 and the destination BS 160.

Since satellites have periodicity and are unable to move once deployed on an orbit due to the nature of the satellites, the communication throughput over a sufficiently long period of time should be maximized. Since that the present invention ultimately seeks to obtain is routing that shows satellite orbital positions and a communication path that can maximize the communication throughput, the communication throughput in the entire link between the source BS 110 and the destination BS 160 during the entire time slot may be expressed as shown in Equation 5.

$$\sum_{n=1}^{N} R_{SD}[n] \quad \text{[Equation 5]}$$

That is, the communication throughput in the entire link between the source BS 110 and the destination BS 160 may be calculated as the sum of the communication throughputs between the source BS 110 and the destination BS 160 during all N time slots in a time frame.

The overall problem including the communication throughput calculation equation and constraints of the entire link of Equation 5 may be expressed as shown in Equation 6.

$$(\mathcal{P}):\ \max_{x_I, x_{\mathcal{J}}, A_{S\mathcal{J}}, A_{\mathcal{J}\mathcal{D}}} \sum_{n=1}^{N} R_{SD}[n] \quad \text{[Equation 6]}$$
$$\text{where}\quad \begin{aligned} A_{S\mathcal{J}} &= \{a_{Si}[n], \forall_i \in \mathcal{J}, \forall_n \in \mathcal{N}\} \\ A_{\mathcal{J}\mathcal{D}} &= \{a_{j\mathcal{D}}[n], \forall_j \in \mathcal{J}, \forall_n \in \mathcal{N}\} \end{aligned}$$
$$\text{s.t. } a_{Si}[n], a_{ij}[n] \in \{0, 1\}, \forall_i, j, n$$
$$x_I < x_J$$
$$\sum_{i \in I} a_{Si}[n] \le 1, \forall_n$$
$$\sum_{j \in \mathcal{J}} a_{j\mathcal{D}}[n] \le 1, \forall_n$$

Here, $x_I$ and $x_J$ denote satellite orbital position variables that indicate the positions of satellites on orbits I and J, respectively, $A_{SI}$ denotes a routing variable that shows the connection relation between the source BS and a satellite located on orbit I, and $A_{JD}$ denotes a routing variable that shows the connection relation between a satellite located on orbit J and the destination BS.

Meanwhile, since it is a very difficult problem to simultaneously obtain the maximum value for all variables, i.e., for the satellite orbital position variable and the routing variable in Equation 6, in an embodiment of the present invention, the optimization problem of the satellite orbital position variables $x_1$ and $x_J$ and the optimization problem of the routing variables $a_{SI}[n]$ and $a_{JD}[n]$ are separately progressed step by step as shown in Equation 7 and Equation 8.

$$(\mathcal{P}1):\ \max_{a_{S\mathcal{I}},a_{\mathcal{J}D}} R_{SD} \qquad \text{[Equation 7]}$$

$$\text{where } \begin{matrix} a_{S\mathcal{I}} = \{a_{Si},\ \forall_i \in \mathcal{J}\} \\ a_{\mathcal{J}D} = \{a_{jD},\ \forall_j \in \mathcal{J}\} \end{matrix}$$

$$\text{s.t. } a_{Si}, a_{ij} \in \{0, 1\}, \forall_i, j$$

$$\sum_{i \in I} a_{Si} \le 1$$

$$\sum_{j \in \mathcal{J}} a_{j\mathcal{D}} \le 1$$

$$(\mathcal{P}2):\ \max_{x_I, x_{\mathcal{J}}} \sum_{n=1}^{N} g(x_I, x_{\mathcal{J}}; n) \qquad \text{[Equation 8]}$$

$$\text{s.t. } x_I < x_{\mathcal{J}}$$

That is, a routing variable having the maximum value of the communication throughput in the entire link is determined for each time slot through Equation 7, and satellite orbital position variables having the maximum value of the communication throughput in the entire link to which the determined routing variables are applied is determined through Equation 8. In Equation 8, function g is obtained through Equation 7.

The objective function of Equation 8 is a non-convex function, and the problem of the non-convex function can be solved through a Successive Convex Approximation (SCA) technique. The function g may be expressed as shown in Equation 9.

$$g_{1,n}(x_I) = W\log_2\left(+\frac{\gamma_0}{(x_S - x_I)^2 + (y_S - y_I)^2 + (H_S - H_I)^2}\right) \qquad \text{[Equation 9]}$$

$$g_{2,n}(x_I, x_J) = W\log_2\left(1 + \frac{\gamma_0}{(x_I - x_J)^2 + (y_I - y_J)^2 + (H_I - H_J)^2}\right)$$

$$g_{3,n}(x_J) = W\log_2\left(1 + \frac{\gamma_0}{(x_J - x_D)^2 + (y_J - y_D)^2 + (H_J - H_D)^2}\right)$$

Here, since $g_{1,n}$, $g_{2,n}$, and $g_{3,n}$ represent $R_{Si}[n]$, $R_{ij}[n]$, and $R_{jD}[n]$, each having a determined routing variable, and $R_{SD}[n]=\min(R_{Si}[n],R_{ij}[n],R_{jD}[n])$, it can be expressed as $g_n(x_I,x_J)=\min(g_{1,n},g_{2,n},g_{3,n})$ At this point, since the function g is a non-convex function for the satellite orbital position variable, this problem can be solved using a surrogate function. The surrogate function uses a Taylor function as shown in Equations 10 to 12.

$$h_{1,n}\left(x_I \,\middle|\, x_I^{(k)}\right) = g_{1,n}\left(x_I^{(k)}\right) + \frac{\partial g_{1,n}}{\partial x_I}\left(x_I^{(k)}\right)\left(x_I - x_I^{(k)}\right) + \frac{1}{2}\frac{\partial^2 g_{1,n}}{\partial x_I^2}\left(x_I^{(k)}\right)\left(x_I - x_I^{(k)}\right)^2 \qquad \text{[Equation 10]}$$

$$h_{2,n}\left(x_I, x_J \,\middle|\, x_I^{(k)}, x_J^{(k)}\right) = g_{2,n}\left(x_I^{(k)}, x_J^{(k)}\right) + \frac{\partial g_{2,n}}{\partial x_I}\left(x_I^{(k)}, x_J^{(k)}\right)\left(x_I - x_I^{(k)}\right) + \frac{\partial g_{2,n}}{\partial x_J}\left(x_I^{(k)}, x_J^{(k)}\right)\left(x_J - x_J^{(k)}\right) + \frac{1}{2}\left(\frac{\partial^2 g_{2,n}}{\partial x_I^2}\left(x_I^{(k)}, x_J^{(k)}\right)\left(x_I - x_I^{(k)}\right)^2 + \frac{\partial^2 g_{2,n}}{\partial x_J^2}\left(x_I^{(k)}, x_J^{(k)}\right)\left(x_J - x_J^{(k)}\right)^2 + 2\frac{\partial^2 g_{2,n}}{\partial x_I x_J}\left(x_I^{(k)}, x_J^{(k)}\right)\left(x_I - x_I^{(k)}\right)\left(x_J - x_J^{(k)}\right)\right) \qquad \text{[Equation 11]}$$

$$h_{3,n}\left(x_J \,\middle|\, x_J^{(k)}\right) = g_{3,n}\left(x_J^{(k)}\right) + \frac{\partial g_{3,n}}{\partial x_J}\left(x_J^{(k)}\right)\left(x_J - x_J^{(k)}\right) + \frac{1}{2}\frac{\partial^2 g_{3,n}}{\partial x_J^2}\left(x_J^{(k)}\right)\left(x_J - x_J^{(k)}\right)^2 \qquad \text{[Equation 12]}$$

Here, $h_{1,n}$, $h_{2,n}$, and $h_{3,n}$ are surrogate functions of $g_{1,n}$, $g_{2,n}$, and $g_{3,n}$, respectively, and k denotes the k-th iteration of the SCA technique.

The entire function may be expressed as shown in Equation 13 and Equation 14.

$$h_n\left(x_I, x_J \,\middle|\, x_I^{(k)}, x_J^{(k)}\right) = \min(g_{1,n}, g_{2,n}, g_{3,n}) \qquad \text{[Equation 13]}$$

$$h_n\left(x_I, x_J \,\middle|\, x_I^{(k)}, x_J^{(k)}\right) = \sum_{n=1}^{N} h_n = A + B\left(x_I - x_I^{(k)}\right) + C\left(x_J - x_J^{(k)}\right) + \frac{D}{2}\left(x_I - x_I^{(k)}\right)^2 + \frac{E}{2}\left(x_J - x_J^{(k)}\right)^2 + F\left(x_I - x_I^{(k)}\right)\left(x_J - x_J^{(k)}\right) \qquad \text{[Equation 14]}$$

Since the maximum value of the entire function shown in Equation 13 and Equation 14 should be obtained, the solution is obtained through partial differentiation as shown in Equation 15 and Equation 16.

$$\frac{\partial h}{\partial x_I} = B + D\left(\hat{x}_I^{(k)} - x_I^{(k)}\right) + F\left(\hat{x}_J^{(k)} - x_J^{(k)}\right) = 0 \qquad \text{[Equation 15]}$$

$$\frac{\partial h}{\partial x_J} = C + D\left(\hat{x}_J^{(k)} - x_J^{(k)}\right) + F\left(\hat{x}_I^{(k)} - x_I^{(k)}\right) = 0 \qquad \text{[Equation 16]}$$

Here, $$\hat{x}_I^{(k)} \text{ and } \hat{x}_J^{(k)}$$

are coordinates of the optimal point of function h, and may be expressed as shown in Equation 17 and Equation 18.

$$\hat{x}_I^{(k)} = \frac{(DE - F^2)x_I^{(k)} - BE + FC}{DE - F^2} \qquad \text{[Equation 17]}$$

$$\hat{x}_J^{(k)} = \frac{(F^2 - DE)x_J^{(k)} - BF + DC}{F^2 - DE} \qquad \text{[Equation 18]}$$

When $F^2-DE=0$ in Equation 18, a problem that the denominator becomes 0 occurs, so that in this case, initial values $$\hat{x}_I^{(0)} \text{ and } \hat{x}_J^{(0)}$$

are newly defined, and the same process is repeated. According to the SCA technique, each iteration is progressed as shown in Equation 19.

$$x_I^{(k+1)} = x_I^{(k)} + \gamma(\hat{x}_I^{(k)} - x_I^{(k)})$$ [Equation 19]

$$x_J^{(k+1)} = x_J^{(k)} + \gamma(\hat{x}_J^{(k)} - x_J^{(k)})$$

Figure 4:
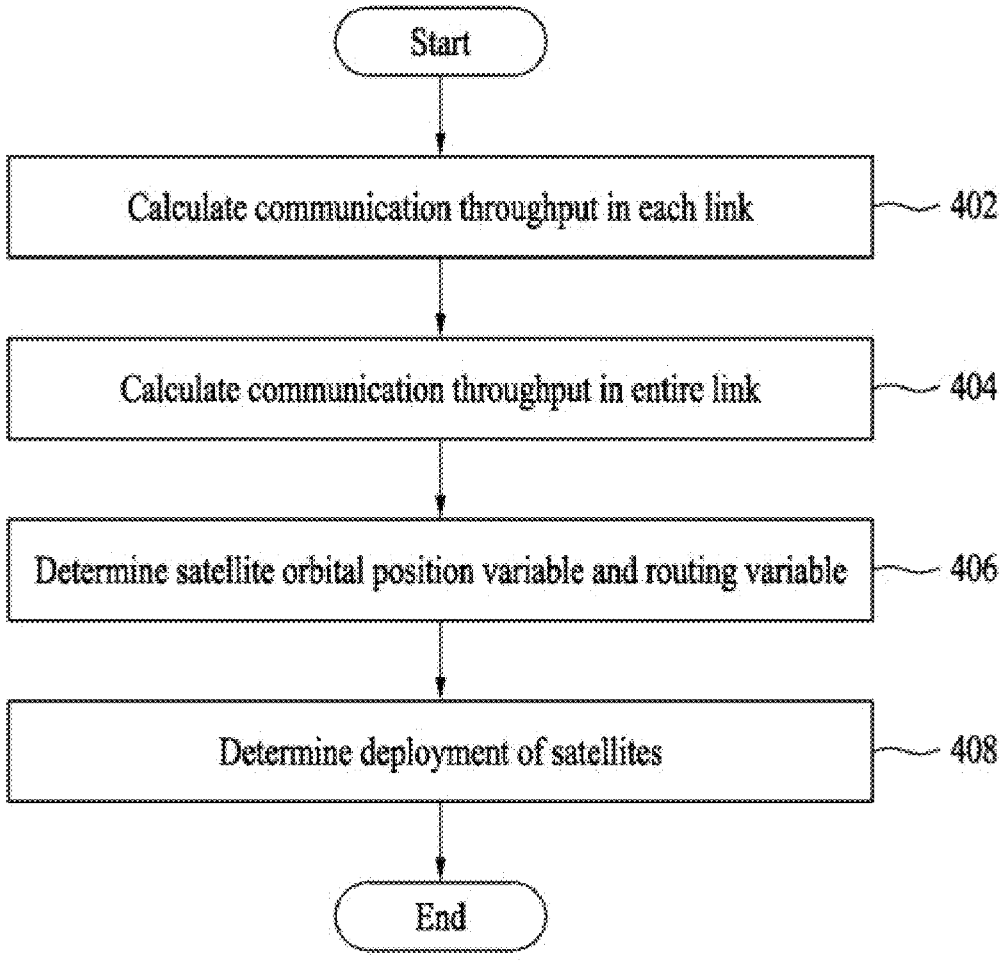
FIG. 4 is a flowchart illustrating the operation of an apparatus for optimizing satellite orbital positions and routing according to an embodiment of the present invention.

FIG. 4 is a flowchart illustrating the operation of an apparatus (referred to herein below as "optimizer") for optimizing satellite orbital positions and routing according to an embodiment of the present invention. An example configuration of the apparatus (or optimizer) is described with respect to FIG. 2.

Referring to FIG. 4, at step 402, an optimizer calculates a communication throughput in each link, i.e., a link between a transmitting BS and a satellite deployed on a first orbit close to the transmitting BS, a link between a satellite deployed on a second orbit close to a receiving BS and the receiving BS, and a link between the satellites deployed on the first and second orbits.

At step 404, the optimizer calculates a communication throughput in all links between the transmitting BS and the receiving BS on the basis of the communication throughput in each link calculated at step 402.

At step 406, the optimizer determines satellite orbital position variables and routing variables so that the communication throughput in the entire link calculated at step 404 is maximized. That is, for each time slot, the optimizer determines optimal routing variables having the maximum communication throughput in the entire link, and determines optimal satellite orbital position variables having the maximum communication throughput in the entire link to which the determined optimal routing variables are applied.

At step 408, the optimizer determines deployment of satellites on the first and second orbits on the basis of the satellite orbital position variables and the routing variables determined at step 406. In at least one embodiment, the optimizer controls deployment of satellites on the first and second orbits on the basis of the satellite orbital position variables and the routing variables determined at step 406. For example, the optimizer sends, through a communication circuitry of the optimizer, instructions to corresponding satellites on the first and second orbits, or to the satellites' respective controlling systems, to control the satellites to be deployed in accordance with the determined satellite orbital position variables. In at least one embodiment, the optimizer controls communication between the transmitting BS and the receiving BS to occur over satellites deployed in accordance with the determined satellite orbital position variables and the determined routing variables. The described operations are examples. Other operations within the scopes of various embodiments.

Figure 5:
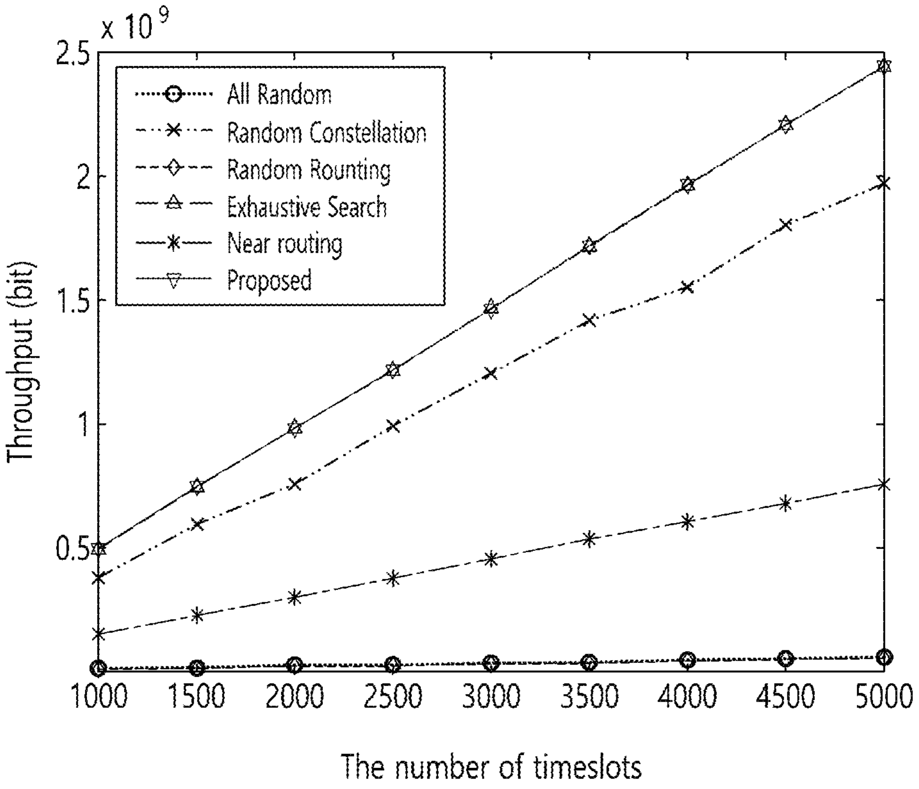
FIG. 5 is a graph showing a result of a simulation applying the satellite orbital position and routing optimization technique according to an embodiment of the present invention.

FIG. 5 is a graph showing a result of a simulation applying the satellite orbital position and routing optimization technique according to an embodiment of the present invention.

Referring to FIG. 5, the illustrated graph shows the communication throughput according to the total number of time slots N, and it is assumed that the heights of orbit I $H_I$ and orbit J $H_J$ are 500 km and 400 km, respectively, the number of satellites $K_I$ and $K_J$ deployed on the two orbits is 40, the reference SNR $\gamma_0$ is $10^9$, the bandwidth B is $10^9$ Hz, and the step size $\gamma$ is −0.1. In addition, it is assumed that the coordinates of the transmitting BS and the receiving BS are set to (0,0,0) and (3000 km,3000 km,0), respectively.

As can be confirmed through FIG. 5, it can be seen that the communication throughput according to the proposed graph to which the satellite orbital position and routing optimization technique proposed in the present invention is applied is almost identical to the communication throughput according to the exhaustive search graph to which a technique of listing and confirming all the number of cases is applied.

The method of determining satellite orbital positions and routing of the present invention as described above may be implemented in the form of program instructions that can be executed through various computer components and recorded in a non-transitory computer-readable recording medium. The computer-readable recording medium may store program instructions, data files, data structures, and the like alone or in combination.

The program instructions recorded in the computer-readable recording medium may be specially designed and configured for the present invention or may be known to and used by those skilled in the field of computer software.

Examples of the non-transitory computer-readable recording medium include magnetic media such as hard disks, floppy disks, and magnetic tapes, optical media such as CD-ROMs and DVDs, magneto-optical media such as floptical disks, and hardware devices specially configured to store and execute program instructions, such as ROM, RAM, flash memory, and the like.

Examples of the program instructions include high-level language codes that can be executed by a computer using an interpreter or the like, as well as machine language codes such as those produced by a compiler. The hardware devices described above may be configured to operate as one or more software modules to perform the processes according to the present invention, and vice versa.

Although various embodiments of the present invention have been shown and described above, the present invention is not limited to the specific embodiments described above, and of course, various modified embodiments are possible by those skilled in the art without departing from the gist of the present invention claimed in the claims, and these modified embodiments should not be individually understood from the technical spirit or prospect of the present invention.

According to one aspect of the present invention described above, as a method, a recording medium, and an apparatus for optimizing satellite orbital positions and a path for a low earth orbit satellite network are provided, the communication throughput maximizing problem can be solved, and it may contribute to improving communication quality.

DESCRIPTION OF SYMBOLS

100: Low Earth Orbit Satellite Network
110: Source BS
120, 130, 140, 150: Satellite
160: Destination BS
200: Apparatus

What is claimed is:

1. A method of determining satellite orbital positions and routing for a Low Earth Orbit (LEO) satellite network located on a first orbit on a side of a transmitting base station and located on a second orbit on a side of a receiving base station, the method comprising:

calculating a communication throughput in each link of:
- a link between the transmitting base station and a satellite deployed on the first orbit,
- a link between satellites deployed on the first and second orbits, and
- a link between a satellite deployed on the second orbit and the receiving base station;

calculating a communication throughput in an entire link between the transmitting base station and the receiving base station based on the calculated communication throughput in said each link;

determining satellite orbital position variables and routing variables for maximizing the communication throughput in the entire link; and determining deployment of satellites on the first and second orbits based on the determined satellite orbit position variables and routing variables.

2. The method according to claim 1, wherein the communication throughput in the entire link is calculated as a sum of the communication throughputs between the transmitting base station and the receiving base station during all time slots in a time frame.

3. The method according to claim 2, wherein the communication throughput in the entire link in a time slot n is calculated based on:

a connection relation between the transmitting base station and an i-th satellite among satellites deployed on the first orbit, a connection relation between a j-th satellite among satellites deployed on the second orbit and the receiving base station, and a minimum communication throughput among a communication throughput in a link between the transmitting base station and the i-th satellite, a communication throughput in a link between the i-th satellite and the j-th satellite, and a communication throughput in a link between the j-th satellite and the receiving base station.

4. The method according to claim 1, wherein the determining the routing variables comprises:

determining, for each time slot, a routing variable having a maximum communication throughput in the entire link.

5. The method according to claim 4, wherein the determining the satellite orbital position variables comprises:

determining, for each time slot, a satellite orbital position variable having a maximum communication throughput in the entire link to which the determined routing variable is applied.

6. The method according to claim 1, wherein the satellites deployed on the first and second orbits transmit signals in a Decode and Forward (DF) relay method.

7. An apparatus for determining satellite orbital positions and routing for a Low Earth Orbit (LEO) satellite network located on a first orbit on a side of a transmitting base station and located on a second orbit on a side of a receiving base station, the apparatus comprising:

a communication throughput calculation unit configured to calculate a communication throughput in each link of:

a link between the transmitting base station and a satellite deployed on the first orbit, a link between satellites deployed on the first and second orbits, and a link between a satellite deployed on the second orbit and the receiving base station, and calculate a communication throughput in an entire link between the transmitting base station and the receiving base station based on the calculated communication throughput in said each link;

a variable determination unit configured to determine satellite orbital position variables and routing variables for maximizing the communication throughput in the entire link; and a satellite deployment determination configured to determine deployment of satellites on the first and second orbits based on the determined satellite orbit position variables and routing variables.

8. The apparatus according to claim 7, wherein the communication throughput calculation unit is configured to calculate the communication throughput in the entire link as a sum of the communication throughputs between the transmitting base station and the receiving base station during all time slots in a time frame.

9. The apparatus according to claim 8, wherein the communication throughput calculation unit is configured to calculate the communication throughput in the entire link in a time slot n based on:

a connection relation between the transmitting base station and an i-th satellite among satellites deployed on the first orbit, a connection relation between a j-th satellite among satellites deployed on the second orbit and the receiving base station, and a minimum communication throughput among a communication throughput in a link between the transmitting base station and the i-th satellite, a communication throughput in a link between the i-th satellite and the j-th satellite, and a communication throughput in a link between the j-th satellite and the receiving base station.

10. The apparatus according to claim 7, wherein the variable determination unit is configured to determine, for each time slot, a routing variable having a maximum communication throughput in the entire link.

11. The apparatus according to claim 10, wherein the variable determination unit is configured to determine, for each time slot, a satellite orbital position variable having a maximum communication throughput in the entire link to which the determined routing variable is applied.

12. The apparatus according to claim 7, wherein the satellites deployed on the first and second orbits transmit signals in a Decode and Forward (DF) relay method.

13. A non-transitory computer-readable recording medium containing a computer program executable by a processor to cause the processor to perform a method of determining satellite orbital positions and routing for a Low Earth Orbit (LEO) satellite network located on a first orbit on a side of a transmitting base station and located on a second orbit on a side of a receiving base station, the method comprising:

calculating a communication throughput in each link of:

a link between the transmitting base station and a satellite deployed on the first orbit, a link between satellites deployed on the first and second orbits, and a link between a satellite deployed on the second orbit and the receiving base station;

calculating a communication throughput in an entire link between the transmitting base station and the receiving base station based on the calculated communication throughput in said each link;

determining satellite orbital position variables and routing variables for maximizing the communication throughput in the entire link; and determining deployment of satellites on the first and second orbits based on the determined satellite orbit position variables and routing variables.

* * * * *